(12) United States Patent
Birkbeck et al.

(10) Patent No.: US 10,268,893 B2
(45) Date of Patent: Apr. 23, 2019

(54) SYSTEM AND METHOD FOR AUTOMATIC DETECTION OF SPHERICAL VIDEO CONTENT

(71) Applicant: Google Inc., Mountain View, CA (US)

(72) Inventors: Neil Aylon Charles Birkbeck, Mountain View, CA (US); Ka-kit Lam, Richmond, CA (US); Damien Kelly, San Francisco, CA (US); Andrew Joseph Crawford, San Francisco, CA (US); Anil Christopher Kokaram, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/680,594

(22) Filed: Aug. 18, 2017

(65) Prior Publication Data

US 2017/0344830 A1 Nov. 30, 2017

Related U.S. Application Data

(63) Continuation of application No. 14/927,795, filed on Oct. 30, 2015, now Pat. No. 9,767,363.

(51) Int. Cl.
*G06K 9/00* (2006.01)
*G06K 9/22* (2006.01)
(Continued)

(52) U.S. Cl.
CPC ..... *G06K 9/00718* (2013.01); *G06F 17/3079* (2013.01); *G06F 17/30799* (2013.01); *G06K 9/00684* (2013.01); *G06K 9/00744* (2013.01); *G06K 9/224* (2013.01); *G06K 9/4604* (2013.01); *G06K 9/4633* (2013.01); *G06K 9/52* (2013.01); *G06T 7/13* (2017.01); *G06T 7/136* (2017.01); *G06T 7/40* (2013.01); *H04N 5/23238* (2013.01); *H04N 13/139* (2018.05);
(Continued)

(58) Field of Classification Search
None
See application file for complete search history.

(56) References Cited

U.S. PATENT DOCUMENTS 7,333,646 B2   2/2008 Cathier et al.
8,217,956 B1   7/2012 Jin
(Continued)

FOREIGN PATENT DOCUMENTS

WO   2011098936 A2   8/2011
WO   2017074786 A1   5/2017

OTHER PUBLICATIONS

Notice of Allowance for U.S. Appl. No. 14/927,795, dated May 19, 2017, 28 pages.
(Continued)

*Primary Examiner* — Kim Y Vu
*Assistant Examiner* — Nathan J Bloom
(74) *Attorney, Agent, or Firm* — Brake Hughes Bellermann LLP

(57) ABSTRACT

Systems and methods are described for identifying the video content as spherical video or non-spherical video in response to determining that frame scores and video scores satisfy a threshold level. For example, a plurality of image frames can be extracted from video content, classified in a dual stage process, and scored according to particular classification and scoring mechanisms.

20 Claims, 7 Drawing Sheets

(51) Int. Cl.

| | | |
|---|---|---|
| *G06K 9/46* | (2006.01) | |
| *G06K 9/52* | (2006.01) | |
| *G06T 7/13* | (2017.01) | |
| *G06T 7/40* | (2017.01) | |
| *G06F 17/30* | (2006.01) | |
| *G06T 7/136* | (2017.01) | |
| *H04N 5/232* | (2006.01) | |
| *H04N 13/139* | (2018.01) | |
| *H04N 21/234* | (2011.01) | |

(52) U.S. Cl.
CPC ... *H04N 21/23418* (2013.01); *G06T 2200/08* (2013.01); *G06T 2207/10016* (2013.01)

(56) References Cited

U.S. PATENT DOCUMENTS

| | | |
|---|---|---|
| 9,582,731 B1 | 2/2017 | Ettinger et al. |
| 2001/0033303 A1 | 10/2001 | Anderson et al. |
| 2006/0023105 A1 | 2/2006 | Kostrzewski et al. |
| 2006/0187305 A1* | 8/2006 | Trivedi .............. G06K 9/00234 348/169 |
| 2007/0030396 A1 | 2/2007 | Zhou et al. |
| 2010/0231687 A1 | 9/2010 | Amory et al. |
| 2010/0250120 A1 | 9/2010 | Waupotitsch et al. |
| 2010/0299630 A1 | 11/2010 | McCutchen et al. |
| 2011/0267360 A1 | 11/2011 | Lee et al. |
| 2012/0300027 A1 | 11/2012 | Urisu et al. |
| 2012/0314028 A1 | 12/2012 | Bruls et al. |
| 2013/0215221 A1* | 8/2013 | Wang .................. G06T 7/73 348/43 |
| 2013/0216094 A1* | 8/2013 | DeLean ............. G06K 9/00335 382/103 |
| 2013/0326419 A1 | 12/2013 | Harada et al. |
| 2014/0023348 A1* | 1/2014 | O'Kelly ............. G11B 27/031 386/278 |
| 2015/0077416 A1 | 3/2015 | Villmer |
| 2015/0091899 A1* | 4/2015 | Grangetto ............ G06T 19/20 345/419 |
| 2015/0256746 A1 | 9/2015 | MacMillan et al. |
| 2016/0012855 A1* | 1/2016 | Krishnan ............. G11B 27/105 386/241 |
| 2016/0142697 A1 | 5/2016 | Furton et al. |
| 2016/0198140 A1 | 7/2016 | Nadler |
| 2016/0352791 A1 | 12/2016 | Cower et al. |
| 2017/0124398 A1 | 5/2017 | Birkbeck et al. |

OTHER PUBLICATIONS

Bublcam, "Bublcam spherical video camera," Mar. 2014, retrieved on Sep. 30, 2015 from http://www.bublcam.com, 8 pages.

Ricoh, "Ricoh theta 360 video camera," Mar. 2014, retrieved on Sep. 30, 2015 from http://theta360.com/en/, 4 pages.

Google, "Spherical metadata standard," retrieved on Sep. 30, 2015 from http://github.com/google/spatial-media, 1 page.

Ferreira et al., "3D Video Shot Boundary Detection Based on Clustering of Depth-Temporal Features", 2013 11th International Workshop on Content-Based Multimedia Indexing (CBMI), Veszprem, 2013, pp. 1-6.

Friedman, et al, "Additive Logistic Regression: A Statistical View of Boosting", Special Invited Paper, The Annals of Statistics, vol. 28, No. 2, 2000, pp. 337-407.

Holbrook, "Blog—The Latest for Creators, Brands and Fans", Apr. 27, 2015, 6 pages.

Moon, "Facebook explains the tech behind its 360-degree videos", retrieved from http://www.engadget.com/2015/10/15/facebook-360-degree-video-tech/ on Oct. 15, 2015, 7 pages.

International Search Report and Written Opinion for PCT Application No. PCT/US2016/57879, dated Dec. 14, 2016, 15 pages.

Stahlberg, et al., "Digital Image Processing in Natural Sciences and Medecine", Digital Image Processing in Natural Sciences and Medecine, Sep. 7, 2002, pp. 97-130.

Steedly et al., "Efficiently Registering Video Into Panoramic Mosaics", Tenth IEEE International Conference on Computer Vision (ICCV'05), vol. 1, Beijing, 2005, pp. 1300-1307.

Su, Sheng, et al., "A Novel 3D Video Format Identification Algorithm", Proceedings of the Second International Conference on Communications, Signal Processing, and Systems vol. 246 of the Series Lecture Notes in Electrical Engineering, Oct. 24, 2013, pp. 225-232.

Yueli, et al., "Automatic 3D video detection", 2014 International Conference on Information Science, Electronics and Electrical Engineering, IEEE, Apr. 26, 2014, pp. 274-277.

Ihang, et al., "Automatic 3D video format detection", Stereoscopic Displays and Applications XXII, SPIE, vol. 7863, No. 1, Feb. 10, 2011, pp. 1-10.

* cited by examiner

SYSTEM AND METHOD FOR AUTOMATIC DETECTION OF SPHERICAL VIDEO CONTENT

CROSS-REFERENCE TO RELATED APPLICATION

This application claims priority to, and is a continuation of, U.S. patent application Ser. No. 14/927,795, filed on Oct. 30, 2015, entitled "SYSTEM AND METHOD FOR AUTOMATIC DETECTION OF SPHERICAL VIDEO CONTENT", the disclosure of which is incorporated by reference herein in their entirety.

TECHNICAL FIELD

This description generally relates to methods and devices for capturing and processing spherical image content.

BACKGROUND

Spherical video sharing platforms can allow users to upload and share captured spherical image content. Spherical image content can be captured using a number of cameras or camera rigs configured to capture all rays directed outward from a single point. The rays may be used to generate three-dimensional spherical panoramas of scenes.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that includes receiving, at a video server, video content, extracting a plurality of image frames from the video content, classifying, in a first stage, the plurality of image frames according to a first set of features, the classifying including identifying a portion of the plurality of image frames as candidate image frames, classifying, in a second stage, the candidate image frames according to a second set of features, the classifying including assigning a frame score to each of the candidate image frames, the frame score being based on at least one of the second set of features, selecting a portion of the candidate image frames having a frame score satisfying a threshold frame score condition. The method also includes generating a video score for the video content by aggregating together the portion of the candidate image frames having a frame score satisfying the threshold frame score condition, and identifying the video content as spherical video content in response to determining that the video score satisfies a threshold video score. Other embodiments of this aspect include corresponding computer systems, apparatus, and computer programs recorded on one or more computer storage devices, each configured to perform the actions of the methods.

Implementations may include one or more of the following features. The method further including monitoring for additional video content, at the video server and in response to detecting the additional video content, automatically performing the first stage and the second stage to classify the additional video content and identifying the additional video content as spherical video content or non-spherical video content based at least in part on an output of the first stage and the second stage. The method in which the first stage and the second stage are configured using a plurality of training videos that model spherical and non-spherical video content according to the first set of features and the second set of features. The method in which the first stage includes analyzing at least two edges of each of the plurality of image frames. The method in which the second stage includes analyzing central regions of the candidate image frames. The method in which the second stage includes performing at least one of generating a grayscale version of the candidate image frames and calculating a standard deviation of the grayscale version of the candidate image frames, calculating entropy of the grayscale version of the candidate image frames, and calculating entropy of an edge detected version of the candidate image frames.

The method can also include using a first set of features that include at least two calculations corresponding to the plurality of image frames, the calculations including an aspect ratio, video dimension, standard deviation at both image poles, and left and right border variances. The second set of features can include at least two calculations corresponding to the candidate image frames, the calculations including a standard deviation, an edge detection, an image entropy, an image entropy of the edge detection, a Hough transform, a measure of texture for at least one pole defined in at least one image frame, and a metric corresponding to an edge of at least one image frame and a column of pixels adjacent to the edge. The method can include using the second set of features that are defined and calculated according to at least one image projection type selected from the group including of an equirectangular projection, a warped equirectangular projection, a rectilinear projection, a circular projection, and a stereographic projection. Implementations of the described techniques may include hardware, a method or process, or computer software on a computer-accessible medium.

Another general aspect includes a video management system including instructions stored on one or more non-transitory computer-readable storage medium. The system may include a video server configured to receive, from a plurality of users, uploaded video content, the uploaded video content including a plurality of images, an extractor module configured to extract a plurality of image frames from the video content, a first classifier module configured to classify the plurality of image frames according to a first set of features being associated with the plurality of image frames and identify a portion of the plurality of image frames as candidate image frames, and a second classifier module configured to classify the candidate image frames according to a second set of features being associated with the candidate image frames. The system may also include a scoring module configured to generate a plurality of frame scores corresponding to the plurality of image frames and a plurality of video scores corresponding to the video content, the scoring module generating a categorization marker applicable to the video content, the categorization marker indicating spherical video content or non-spherical video content and being based on the plurality of frames scores and the plurality of video scores. Other embodiments of this aspect include corresponding computer systems, apparatus, and computer programs recorded on one or more computer storage devices, each configured to perform the actions of the methods.

Implementations may include one or more of the following features. The video management system may also include an image analyzer configured to analyze image characteristics in the plurality of image frames, the image analyzer adapted to perform calculations based on the first set of features and on the second set of features. The video management system may include and use the first set of features includes at least two calculations corresponding to the plurality of image frames, the calculations including an aspect ratio, video dimension, standard deviation at both image poles, and left and right border variances. The video management system may include and use the second set of features includes at least two calculations corresponding to the candidate image frames, the calculations including a standard deviation, an edge detection, an image entropy, an image entropy of the edge detection, a Hough transform, a measure of texture for at least one pole defined in at least one image frame, and a metric corresponding to an edge of at least one image frame and a column of pixels adjacent to the edge.

In some implementations, the video management system may be configured for using the second classifier module to perform at least one of generating a grayscale version of the candidate image frames and calculating a standard deviation of the grayscale version of the candidate image frames, calculating entropy of the grayscale version of the candidate image frames, and/or calculating entropy of an edge detected version of the candidate image frames. In some implementations, classification criteria is generated for the first classifier module and the second classifier module using a plurality of training videos that model spherical and non-spherical video content according to the first set of features and the second set of features.

In another general aspect, a non-transitory recordable storage medium having recorded and stored thereon instructions is also described. The instructions, when executed, perform actions such as receiving, at a video server, video content, extracting a plurality of image frames from the video content, and classifying, during a first stage, the plurality of image frames according to a first set of features. The classifying may include identifying a candidate image frame from the plurality of image frames. The instructions may further include assigning, during a second stage, a frame score to the candidate image based on at least one of a second set of features, selecting the candidate image frame when the frame score satisfies a threshold frame score condition, generating a video score for the video content based on the candidate image frame, and defining the video content as spherical video content in response to determining that the video score satisfies a threshold video score.

Example implementations may include one or more of the following features. In some implementations, the instructions may also include monitoring for additional video content, at the video server, and in response to detecting the additional video content, automatically performing the stage and the second stage to classify the additional video content. The first set of features may include at least two calculations corresponding to the plurality of image frames, the calculations including an aspect ratio, video dimension, standard deviation at both image poles, and left and right border variances. The second set of features may include at least two calculations corresponding to the candidate image frames, the calculations including a standard deviation, an edge detection, an image entropy, an image entropy of the edge detection, a Hough transform, a measure of texture for at least one pole defined in at least one image frame, and a metric corresponding to an edge of at least one image frame and a column of pixels adjacent to the edge. In some implementations, the second set of features are defined and calculated according to at least one image projection type selected from the group consisting of an equirectangular projection, a warped equirectangular projection, a rectilinear projection, a circular projection, and a stereographic projection.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
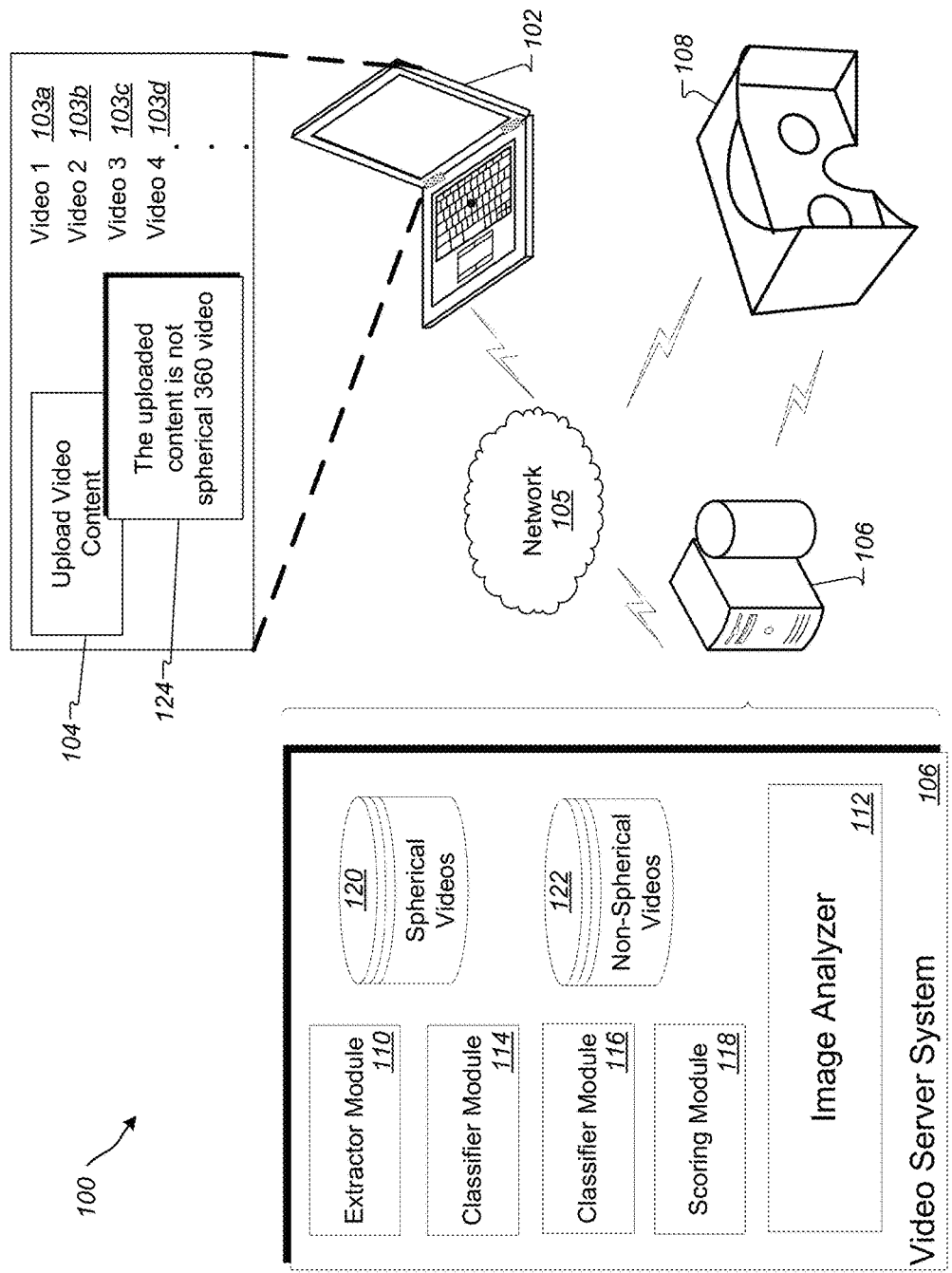
FIG. 1 is a block diagram of an example system for detecting, processing, and rendering spherical image content.

Particular types of video capture equipment and techniques can be used to capture and generate spherical video content (e.g., 360-video) that provides a view from all directions, with respect to a single point. Spherical video content may include a variety of images and data that can be presented to users to provide interactive viewing experiences. For example, spherical video content may be used to offer three-dimensional, 360 degrees of video depicting sporting events, cultural preservation, and virtual presence content, just to name a few examples.

Properly presenting such spherical video content on a client device may depend on configuration details of a media player performing playback of the content as well as detected formatting of the video content. The systems and methods described in this disclosure provide a way to automatically detect whether particular image content includes spherical video content or features. In response to detecting spherical video content, the systems and methods described herein can be configured to playback the video content in a 3D form with spherical aspects.

In general, users of systems described herein can upload video content to a video server system. The video server system can automatically analyze image frames within the video content to detect image features that signify spherically captured video content. The detection process can provide resilience to errors in explicit video container level signaling and may function to combat intentional erroneous container level signaling, such as when a user attempts to bypass copyright detection by suggesting that particular video content is formatted in a different representation other than spherical video.

An example view of spherical video content may be represented as an unwrapped version of the globe, and can be parameterized on a two-dimensional (2D) plane in which the poles of the globe can be mapped to the top and bottom of the content, respectively. Such a representation may be captured using equirectangular projection. The systems and methods described in this disclosure can use a set of labels to indicate whether spherical content is present in particular video content. For example, the systems and methods can be used to apply a positive label to indicate spherical content. Similarly, the systems and methods can be used to apply a negative label to indicate non-spherical content. The labels can be applied to sample video content and such sample video content and attached labels can be used to configure (e.g., train, teach, instruct) a two-level cascade of machine learning detectors to classify unseen videos. The labels can be used by media players to detect and configure playback of spherical content in response to detecting spherically captured content is available within a particular video.

The two-level cascade can be used to apply the labels to indicate presences of spherical or non-spherical content in videos uploaded to system 100, for example. The two-level cascade may include two stages, both of which can include a number of analyzing and scoring steps. In a first stage, the systems and methods described herein can perform a number of low cost computations to compute features (e.g., such as aspect ratio, video dimension, standard deviation at the image poles, and the left-right border distances, etc.). The first stage may be used to reduce (e.g., prune, trim) a large number of videos that are readily classified as non-spherical. A second classification stage may also be performed to find elaborate features on the internal areas within a set of image frames. The features in the second stage can include image standard deviation, whether straight lines are straight (using a Hough transform), relative left to right border ratios, and stronger methods to compute whether the poles (top and bottom) of the image are actually spherical. The second classification stage can then use such features to eliminate non-spherical videos that may have passed through the first classification stage undetected.

The systems and methods described herein can be used to passively monitor uploaded video content and to identify the video content in which users have uploaded spherical content, but have inadvertently provided the content with missing spherical metadata or labeling. In some implementations, the systems and methods can also detect whether video content is mismarked as including spherical content or provided with unrecognizable projection formats.

In particular implementations, the systems and methods described herein can provide advantages, including, but not limited to using a two-level cascaded classification system to reject a large number of uploaded videos, without investing costly computational efforts for all uploaded videos received at a video content server. In some implementations, an additional advantage may include providing an automated/machine learned classification process that can automatically tune particular thresholds and feature weighting. In some implementations, the systems and methods described herein can provide a general video content detector that can be trained on specific training samples such that spherical content in equirectangular projection is provided by the video content server. Other content types and projections can be configured using such a detector.

Referring to FIG. 1, a block diagram is shown that includes an example system 100 for detecting, processing, and rendering spherical image content. In the example system 100, a user may upload (e.g., using laptop 102) one or more videos (e.g., 103a, 103b, 103c, 103d, etc.) by selecting an application or website with an upload video content control 104. The videos 103a-d may include video content that can be provided over a network 105, or alternatively, provided directly to a video server system 106 for analysis and processing. Once the video content is received, the video server system 106 can perform a number of calculations and processes on the image content to determine whether the video content is spherical or non-spherical and to determine which projection is associated with the video content. In some implementations, the video server system 106 can also provide the video content to other users (not shown) or to an HMD device 108 for rendering, storage, or further processing.

The HMD device 108 may represent a virtual reality headset, glasses, eyepiece, or other wearable device capable of displaying virtual reality content. In operation, the HMD device 108 can execute a VR application (not shown) which can playback received and/or processed images to a user. In some implementations, the VR application can be hosted by one or more of the devices 102 or 106, shown in FIG. 1.

The video server system 106 may be configured to receive, from a number of users, uploaded video content. The uploaded video content may or may not include spherically captured image content. In some implementations, the uploaded video content includes still image frames that make up video content.

As shown in FIG. 1, the example video server system 106 includes an extractor module 110, an image analyzer 112, a first classifier module 114, a second classifier module 116, and a scoring module 118. As shown in FIG. 1, the video server system 106 also includes a spherical videos repository 120 and a non-spherical videos repository 122 to store video content upon receiving and categorizing such content.

The extractor module 110 may be configured to extract a number of image frames from the video content. For example, a sequence of images with particular heights, widths, and color channels can be extracted for analysis. Extracted images can be used to classify training videos to enable recognition of format of any incoming video received at the video server system 106.

The image analyzer 112 may be configured to analyze image characteristics in the image frames of the video content uploaded to the video server system 106. The image analyzer 112 may be adapted to perform calculations based on a first set of features and on a second set of features that can be ascertained from the video content and image frames making up the video content. The first and second sets of features may be associated with a number of observations and/or calculations performed on the image frames. The calculations may include ascertaining an aspect ratio, video dimensions, standard deviations at image poles, and left and right border variances of the image frames. Additional calculations may include obtaining a standard deviation, an edge detection, an image entropy, an image entropy of the edge detection, a Hough transform, a measure of texture for at least one pole defined in at least one image frame, and a metric corresponding to an edge of at least one image frame and a column of pixels adjacent to the edge. Additional information regarding such features is described in detail below.

The first classifier module 114 may be configured to classify the image frames according to a first set of features and to define a portion of the image frames as candidate image frames. In one example, the system 100 can receive an uploaded video and can begin to analyze image frames in the video. The analysis may include determining an aspect ratio associated with the video/image frames. In general, for spherical video content, the content includes 360 degrees of image views around the equator and 180 degrees of image views up and down. Accordingly, the aspect ratio of typical spherical content may be about 2:1, indicating two units wide and one unit high. If the system 100 detects such an aspect ratio, the first classifier module 114 can determine that the particular video content with the aspect ratio of 2:1 may be spherical and can perform additional analysis in the first stage or can pass the particular video content to the next classifier stage for analysis in a second stage.

The additional analysis in the first stage may include determining a variance throughout the video content. For example, the first classifier module 114 can analyze image intensities and determine a variance across the intensities. In particular, the classifier module 114 can compare a left most column of pixels from an image frame and a right most column of pixels from the image frame. Since typical spherical video generates a sphere of content that can be presented flat in 2D when unwarped, the left and right columns of pixels will likely match closely for variance from top to bottom between the two columns. The variance can be used in combinations with a number of other features to determine whether particular videos are spherical. For example, the system 100 can use the variance level between pixels/columns as one of many inputs and can decide how important the variance features may be (compared to other image features) and can do so automatically through machine learning to achieve a highly ranked result according to a particular training set. In this example, the classifier modules 114 and 116 can automatically tune particular feature weights by analyzing statistics of one or more of the features across positive (e.g., spherical) training examples and negative (non-spherical) training examples.

The second classifier module 116 may be configured to classify the candidate image frames determined as possible spherical content by the first classifier module 114 in the first stage. For example, the second classifier module 116 can classify the candidate image frames according to one or more other features described above. In addition, the second classifier module 116 can assign a frame score for each candidate image frame. The frame score may pertain to a likelihood of spherical content being present within the image frame. That is, if calculations pertaining to particular features indicate spherical content, the second classifier module 116 can assign a score indicating high likelihood of spherical content.

In some implementations, the second classifier module 116 may be configured to generate a grayscale version of the candidate image frames and calculate a standard deviation of the grayscale version of the candidate image frames. In addition, the second classifier module 116 may be configured to calculate an entropy of the grayscale version of the candidate image frames or to calculate an entropy of an edge detected version of the candidate image frames. Entropy (i.e., image entropy) may describe an amount of information which is coded for by a compression algorithm. Low entropy images, such as those containing a large amount of darkness (e.g., black sky), may have very little contrast and large runs of pixels with the same or similar pixel values. An image that is flat may have an entropy of zero. Consequently, such images can be compressed to a relatively small size. By contrast, high entropy images generally have a great deal of contrast from one pixel to the next and consequently cannot be compressed as small as low entropy images. Image entropy can be calculated using compression algorithms to compress images and determine the size of such compressed images. The size can be compared to typical sizes of compressed images generated for spherical video content.

In some implementations, classification criteria is generated for the first classifier module and the second classifier module using training videos configured to model spherical and non-spherical video content. The training videos may include metadata or additional data that describes one or more features associated with the training video. For example, any of the above described features can be associated with multiple measurements that can indicate whether particular video content is spherical video content to non-spherical video content.

The scoring module 118 may be configured to generate frame scores corresponding to a number of image frames that included spherical video features. In addition, the scoring module 118 may be configured to generate a number of video scores corresponding to an overall likelihood of spherical video features detected in the video content for a particular video. The scoring module 118 can generate a categorization marker applicable to the video content. For example, the scoring module 118 can take output from the first classifier module 114 and the second classifier module 116 and aggregate one or more scores associated with particular video content in order to determine and apply a categorization marker. The categorization marker can be used to indicate whether the content is spherical video content or non-spherical video content.

In operation, a user operating laptop 102 can upload video content using upload video content control 104. The video server system 106 can extract image frames from the uploaded video content using extractor module 110. The image analyzer 112 and the classifier modules 114 and 116 can analyze and classify the extracted image frames (and/or associated metadata) to determine whether image features, associated with the image frames, signify spherically captured video content. Scoring can be applied using scoring module 118. Image frames that meet a threshold scoring level can be classified and labeled as including spherical content. Image frames that do not meet the threshold scoring level may be classified as including non-spherical content. Upon classification of the content, the video server system 106 may generate one or more messages to indicate, to the user operating laptop 102, that the uploaded content is spherical or non-spherical. For example, the system 106 can generate a message 124 indicating that the uploaded content is not spherical video content. Other notifications are possible.

Figure 2:
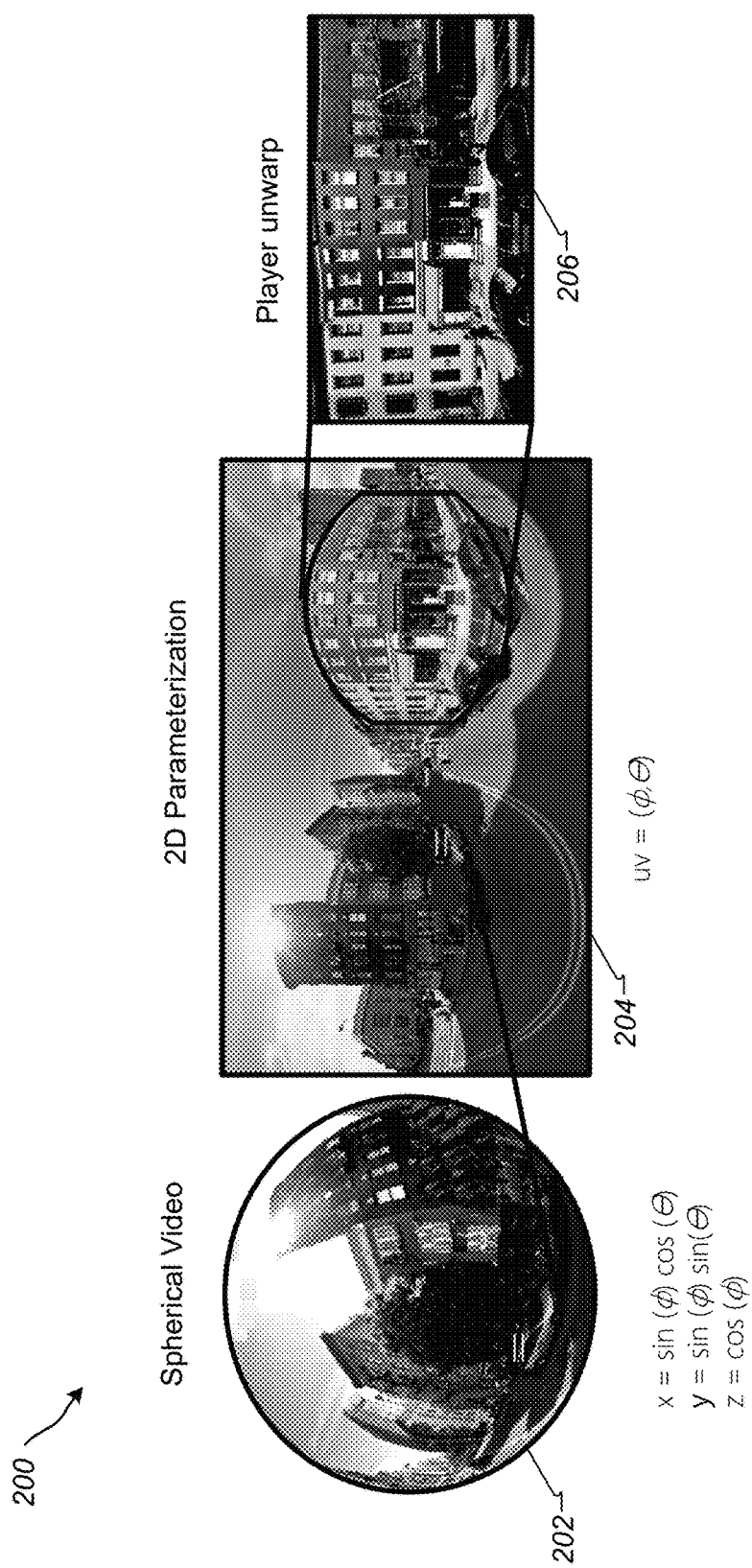
FIG. 2 is a diagram depicting an example of spherical video represented in 2D parameterization.

FIG. 2 is a diagram 200 depicting an example of spherical video 202 represented in 2D parameterization 204. In general, spherical video 202 depicts content in all viewable directions from a single point. The spherical video 202 is represented in a 2D planar parameterization 204. In this example, the 2D planar parameterization (e.g., projection) 204 is equirectangular. During playback, users can interactively select a viewpoint to have the video content played back from the selected point. When the point is selected, the media player can unwarp the content and provide the content during playback as shown at unwarped image 206.

Figure 3:
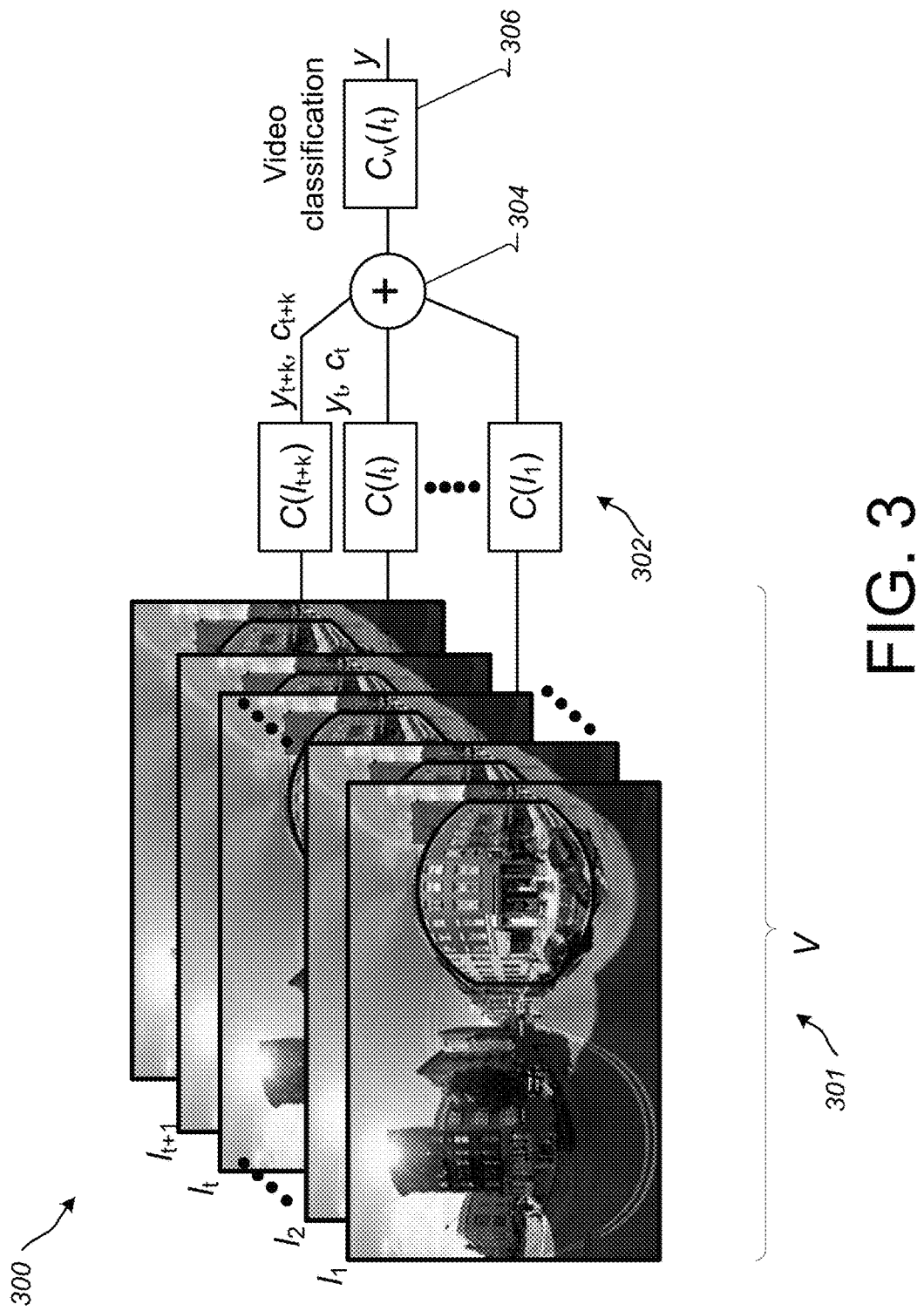
FIG. 3 is a diagram depicting an example image frame classification process.

FIG. 3 is a diagram depicting an example image frame classification process. In this example, selected frames 300 (e.g., $I_1$, $I_2$, $I_t$, $I_{t+1}$) from the video are classified using classifiers 302 and passed through to an aggregator 304 to make a video classification at a video classifier 306. Classifiers 302 and 306 may correspond to classifier modules 114 and 116 (FIG. 1), respectively. Aggregator 304 may correspond to scoring module 118.

In general, the system 100 can perform a classification process that is based on the pooling of a subset of image frames from the video (shown by image frames $I_1$, $I_2$, $I_t$, $I_{t+1}$). In particular, on selected frames, a two-level cascaded classification process may be applied and particular classification labels and scores 304 may be fed as features into the separate video classification module 306.

Formally, a video can be defined as $V=\{I_t\}$ 301 where t goes from 1 to T, as a sequence of T images, $I_t$: $[1, M] \times [1, N]$ $1 \rightarrow R^C$, each with width N and height M and C=3 color channels. In the following discussion, the subscript on I may be removed, as these features may be extracted from each selected image. To train the classifiers, a set of training videos, $V_i$ where i goes from 1 to H, and corresponding class labels, $y_i \in \{-1, +1\}$, where $-1$ represents a non-spherical label and $+1$ represents a spherical label.

To train the image frame classifiers of the two-level cascade, the system 100 can be configured to extract a set of frames and corresponding class labels from a set of training videos. The classification process can include minimizing an energy (e.g., $F_{energy}$) over a number of classifier parameters $\{D\}$ and at least one threshold $\tau$, which may allow a trade-off of the true-positive rate to the false-positive rate using the training set. In some implementations, an Ada-Boost classifier may be used.

The first stage may be trained by minimizing a classification energy function, as shown by equation (1) below.

$$D_1, \tau_1 = \operatorname{argmin}_{D, \tau} F_{energy}(D, \tau, \{(y_i, f_i^{f1})\}) \quad (1)$$

where i goes from 1 to N and the features, $f_{i1}$, belong to a set of features $F_{quick}$ that can be efficiently extracted. The class label for an unseen instance may then be obtained by evaluating the classifier on a corresponding set of features, as shown by equation (2) below.

$$y^{f1} = C_1(f^{f1}; D_1, \tau_1) \quad (2)$$

The parameter $\tau_1$ may be chosen such that the first stage retains high recall. Any false positive image frames at the first stage can be handled by the next stage. The second stage can be trained in a similar manner, although the training set may instead be a subset of entries that have passed through the first classifier, $S=\{i: C_1(f_i^{f1})=+1\}$ using equation (3) below.

$$D_2, \tau_2 = \operatorname{argmin}_{D, \tau} F_{energy}(D, \tau, \{(y_i, f_i^{f2})\} i \in S) \quad (3)$$

The features, $f_i^{f2}$ may be derived from a more computationally expensive process that also inspects the interior of each particular image frame. The two-level classification of an unseen image can then obtained as:

$$C(f) = \{-1 \quad \text{if } C_1(f^{f1}, D_1, \tau_1) = -1 \quad (4)$$
$$C_2(f^{f2}, D_2, \tau_2), \text{ otherwise }\}$$

In order to obtain a final per-video classification, the classification results of the previously mentioned classifier (e.g., the first classification stage) extracted on a subset of video frames (e.g., every nth frame) can be used as features in which to classify the video frames. Let $y_{ik}$ be the class label of the classification of the k-th frame of the i-th video, and let $c_{ik}$ be the raw classification score from the classifier (e.g., classifiers often output the class conditional probability, here $c_{iK}=P(y_{iK}=1|f_{iK})$). A vector of all individual classification results is composed, as shown by equation (5) below.

$$f_v = (c_{i1}, c_{i2}, \ldots, c_{iK}, y_{i1}, y_{i2}, \ldots, y_{iK}) \quad (5)$$

A final video classification can be made by training a classifier on features derived from these individual classification results (e.g., non-linear combinations of the feature elements can be obtained to generate a larger class of features). In the following, an assumption can be made to use the features from equation (5) to train a classifier according to equation (6) below.

$$D_v, \tau_v = \operatorname{argmin}_{D, \tau} F_{energy}(D, \tau, \{y_i, f_v\}_i) \quad (6)$$

An alternative if there are K extracted frames, is to simply use a consensus labeling, as shown by equation (7) below.

$$C_v(V_i) = \{-1 \quad \text{if} \left(\sum_k y_{ik}\right) \leq 0 \quad (7)$$
$$+1 \quad \text{otherwise}\}$$

As described above, a machine learned classifier can be trained on a set of efficient features, $f^{f1} \in F_{quick}$, with positive cases being refined on a set of features, $f^{f2} \in F$, where F is a union of $F_{quick}$ and $F_{interior}$, that includes a class of more computationally expensive features, $F_{interior}$, that analyze the frame contents.

The features described herein may focus on an equirectangular projection, however, this should not be limiting, as similar features can be defined for other projection types, or other projection types can be warped to the equirectangular domain. For example, other project types used with the features described here in may include a rectilinear projection, a circular projection, a Mercator projection, and/or a stereographic projection.

In the first stage of the cascaded classifier, the features, for equirectangular images, may include an aspect ratio of the image frames. The aspect ratio of the image frames may be a strong indicator, as the input images allocate equal pixels per degree. Since $\theta \in [0, 2\pi]$ and $\varphi \in [0, \pi]$, the aspect ratio can be determined near about two. This may be captured using the following Boolean feature shown in equation (8) below.

$$f_{aspect\_thresh} = |\alpha - 2| \leq \tau, \text{ where the tolerance } \tau = 0{:}02 \quad (8)$$

The aspect ratio may also be used as a feature, as shown below in equation (9).

$$f_{aspect} = \alpha \quad (9)$$

Since the points at the top (respective bottom) of an equirectangular image all map to the top (respective bottom) of the sphere, the variance of these points in the image should be low. These features are defined by taking the maximum over C color channels, as shown in equations (10) and (11) below.

$$f_{top} = \operatorname{maxvar}(\{I(1, j, c)\}), \text{ where } j \text{ goes from } 1{:}n \text{ and } c \in C \quad (10)$$

$$f_{bot} = \operatorname{maxvar}(\{I(m, j, c)\}), \text{ where } j \text{ goes from } 1{:}n \text{ and } c \in C \quad (11)$$

The left and right edges of the parameterized sphere belong to a single seam on the edge of the sphere and should have similar values. Using a height normalized version of the L2 distance between two columns of the image, as shown in equation (12) below.

$$g_{L2}(I, j_1, j_2, c) = \frac{1}{m}\sqrt{\sum_{i=1}^{m}(I(i, j_1, c) - I(i, j_2, c))^2} \quad (12)$$

The distance between the left and right edges is used as the border difference feature, as shown in equation (13) below.

$$f_{border\_diff} = \max g_{L2}(I,1,n,c), \text{ where } c \in C \quad (13)$$

As spherical images are often taken of natural scenes, the borders will typically contain some variation. A measure of maximum variance of the border to characterize this:

$$f_{border\_var} = \min(\max\_std(\{I(i,1,c)\}), \max\_std(\{I(i,n,c)\})) \quad (14)$$

where i goes from 1 to m and, where $c \in C$

In general, $f_{top}$, $f_{bot}$, $f_{border\_diff}$, and $f_{border\_var}$ represent features that may be used in the first stage of classification.

Figure 4:
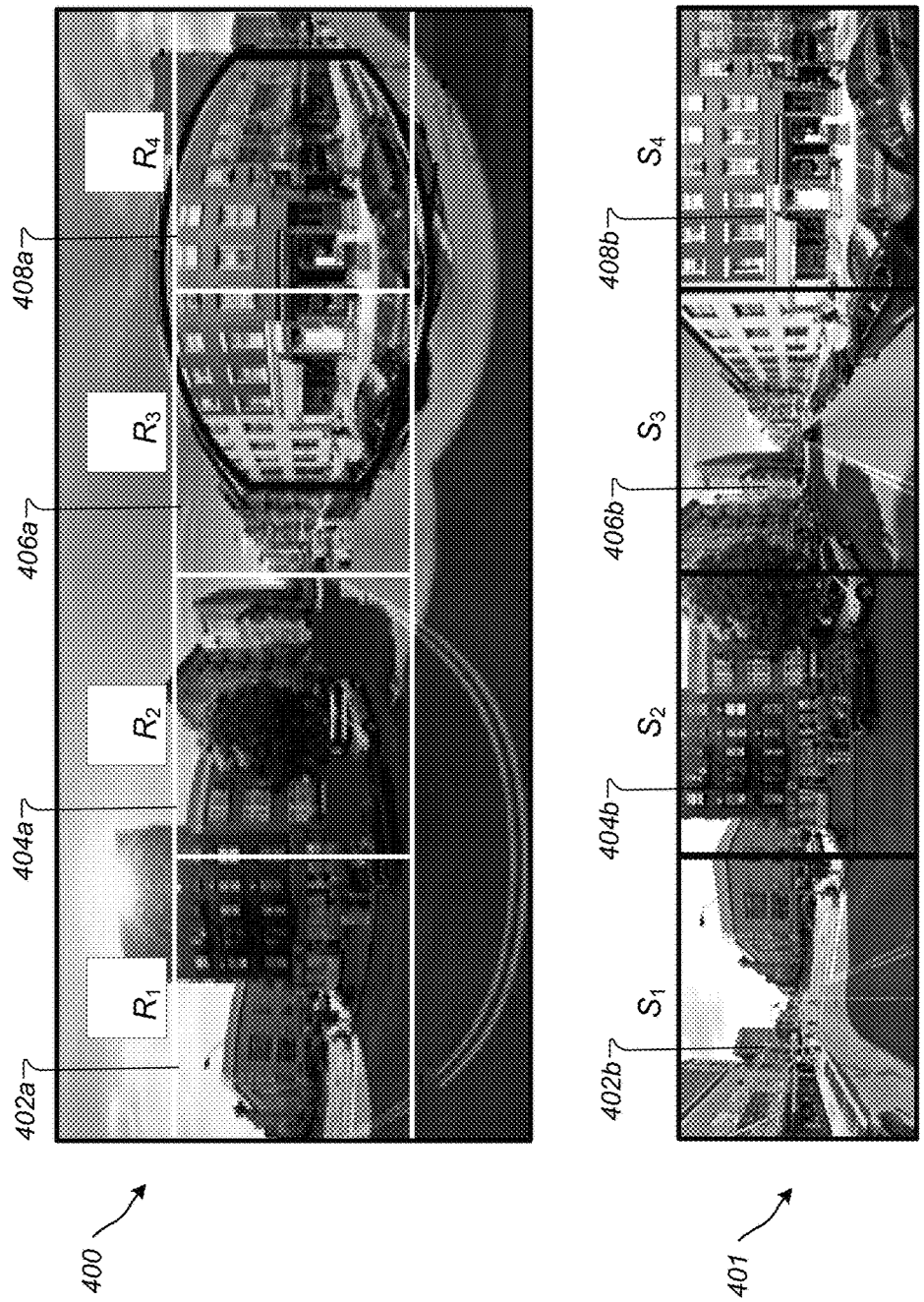
FIG. 4 is a diagram depicting an example of a ratio of a Hough transform of square regions and unwarped images.

Referring to FIG. 4, an original image, $R_k$ 400 is shown with square regions (R1) 402a, (R2) 404a, (R3) 406a, and (R4) 408a. In addition, unwarped images for each compass direction, $S_k$, 401 are shown at (S1) 402b, (S2) 404b, (S3) 406b, and (S4) 408b. The ratio of a Hough transform of the square regions 402a-408a to the unwarped images 402b-408b can be calculated. Here, lines in the image frames are straight in image frames $S_k$ 401.

In the event that a set of image frames successfully pass the first stage of classification, the second stage of classification can be configured to perform in depth analysis of the image frames. Successfully passing in the first stage may indicate that a particular set of image frames was determined to include spherical content within the frames. Since the second stage of the cascaded classifier (e.g., classifier module 116) may operate on image frames in which the first stage (e.g., classifier module 114) has succeeded, the system 100 can be configured to invest additional computation time for feature extraction for the second stage than the system 100 allotted in the first stage. Further, a number of features analyzed in the first stage may not have been configured to examine the central regions of one or more image frames. Accordingly, the second stage can examine complex constraints at the boundaries of the image frames and within the image frames. For example, calculating a standard deviation for content within an image frame may be a useful feature to analyze to avoid computer generated images. In another non-limiting example, a simple letterbox frame with black borders on top and bottom of a white rectangle in the center may include borders that obey the particular features (e.g., low variance at top/bottom of image and left and right edges that agree), but an interior variance may be low and thus, the image may be unlikely to be from a 360 spherical panorama video.

Equation (15) below shows an example equation for the standard deviation calculation, where i goes from 1 to m images, where j goes from 1 to n images, and where $c \in C$.

$$f_{sd} = \max\_var(\{I(i,j,c)\}) \quad (15)$$

A similar feature can be defined ($f_{sd\_hp}$) to represent the standard deviation of a high-pass filtered (Sobel edge detector) version of a grayscale version of the image. The system 100 can also compute $f_{entropy}$ as the entropy of this grayscale image, and $f_{entropy\_hp}$ as the entropy of the edge detected image, which both may serve a similar purpose. In normal projective images, straight lines can project to straight lines. In the spherical parameterization, lines are often curved. For real equirectangular images, more straight lines are expected after the media player has unwarped a particular image. To measure this, a relative feature that extracts four sub-regions from each frame can be performed. These sub-regions may correspond to the 90-degree field of view images along the North, South, East, and West directions.

Letting each of these rectified images be, $S_k$, 401 and the original square regions in the original frame be $R_k$ 400 (FIG. 4), an average of the maximum value of the Hough transform in each of these images can be used as the feature, as shown in equation (16) below.

$$\frac{\sum_{k=1}^{4}\max(Hough(S_k))}{\sum_{k=1}^{4}\max(Hough(R_k))} \quad (16)$$

Experimental Results

The following experiments were performed with a total of 138 spherical videos and 612 non-spherical videos. In each video, the experiment sampled multiple frames for a total of 2904 positive image frames (i.e., positive for spherical content) and 2156 negative image frames. The first stage was trained using an initially gathered subset. The files used to test the second stage were obtained after running the first stage on unseen data and keeping the cases that the first stage had marked as positives. Results for testing on the training data are shown below in Table 1. Note that the first stage was trained on an initial subset of data, and the second stage is trained on positives from the first level, as well as an augmented set of training data (e.g., false positives) from executing the first stage on initially unseen data.

TABLE 1

|  | Stage1 | Stage2 | Combined |
| --- | --- | --- | --- |
| accuracy | 0.9576 | 0.8549 | 0.81343 |
| precision | 1 | 0.9717 | 0.98418 |
| TPR | 0.8351 | 0.7696 | 0.68595 |
| FPR | 0.0 | 0.0301 | 0.01484 |

The experiment used an additional 4249 negative videos and 52 positive examples for testing. The thresholds were tuned for a low false positive rate in training, with which a precision of 0.7169 and a recall of 0.7307 were achieved, as shown by Table 2 below. The corresponding thresholds were $\tau_1 = 4.5$ and $\tau_2 = 0.9$.

TABLE 2

|  | Level1 | Level2 | Combined |
| --- | --- | --- | --- |
| accuracy | 0.9125 | 0.9083 | 0.9932 |
| precision | 0.1086 | 0.0928 | 0.7169 |
| TPR | 0.8653 | 0.75 | 0.7307 |
| FPR | 0.0868 | 0.0897 | 0.0035 |

In the experiments, a ratio of the measure of texture at the pole to the equator was also computed. For notational convenience, let image I, by the image sub-sampled a factor of 32, where the contents of the downsampled image represent the standard-deviation of the corresponding pixels in the higher resolution image. This sub-sampled standard deviation image provides a measure of the texture in the image. The feature is then computed as the ratio of the median texture of the pole to the median texture of the equator, as shown in equation (17) below.

$$\frac{\text{median}(I(1, j)_{j=1}^{n/32})}{\text{median}(I(m/32, j)_{j=1}^{n/32})} \qquad (17)$$

In addition, a feature similar to the $f_{border\_diff}$ feature above and that is measured relative to the vertical boundary before crossing an edge. Here the distance between the edge and the neighboring columns can be used, as shown in equations (18) and (19) below.

$$g_{left} = \max g_{L2}(I,1,2,c), \text{ where } c \in C \qquad (18)$$

$$g_{right} = \max g_{L2}(I,n,n-1,c), \text{ where } c \in C \qquad (19)$$

To define a relative ratio, equation (20) below can be used.

$$f_{border\_diff\_rel} = \frac{f_{border\_diff}}{f_{border\_diff} + 0.5(g_{left}(I) + g_{right}(I))} \qquad (20)$$

Figure 5:
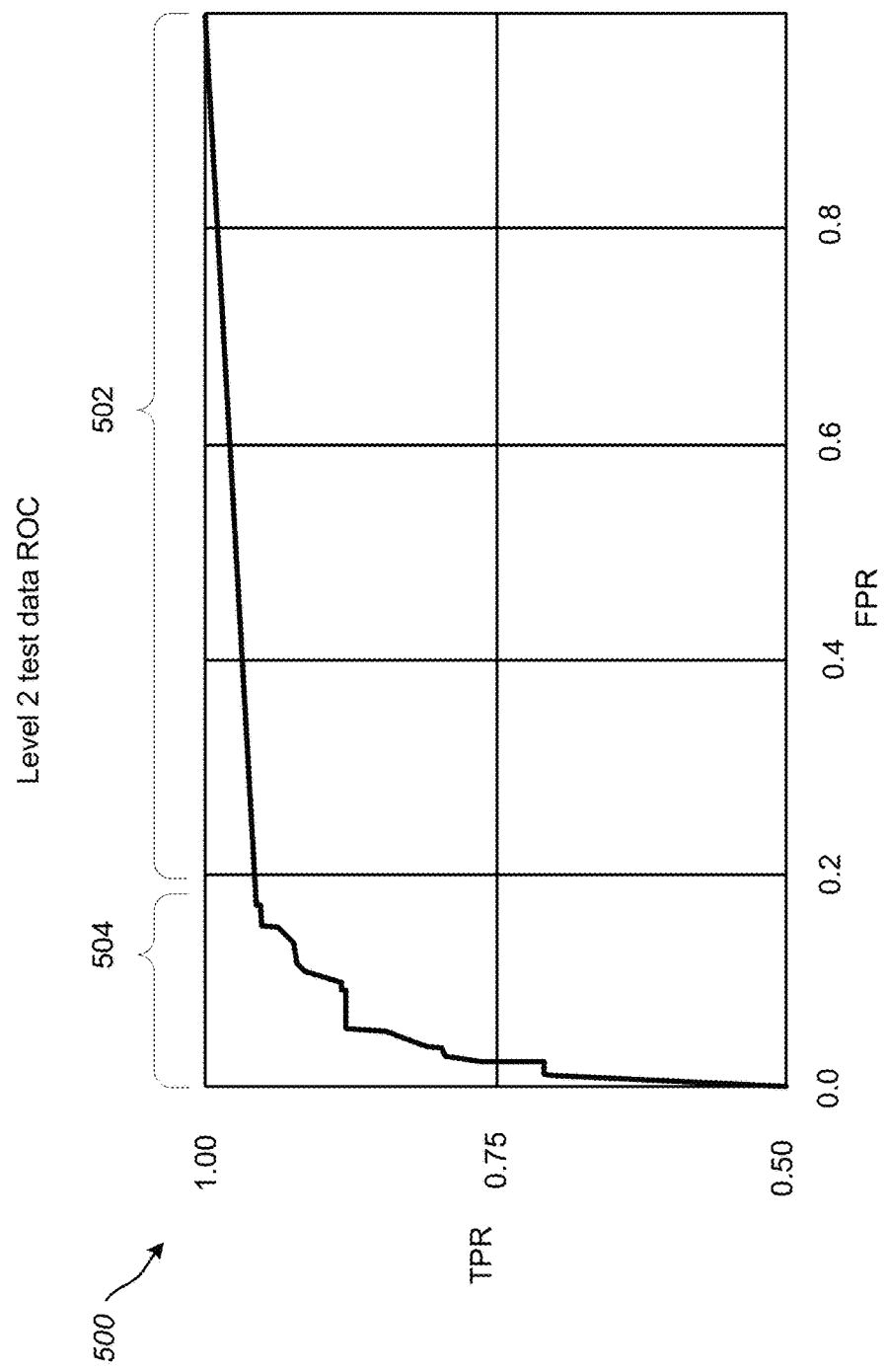
FIG. 5 is an example of classification results achieved using the classification processes described herein.

Referring to FIG. 5, an example of classification results is shown. The results may be achieved using the classification processes described herein. In this example, a receiver-operating characteristic (ROC) curve 500 is illustrated. The ROC curve 500 represents testing at the second stage. In the experiment, the full video classification was tested by considering a set of 3162 videos, containing 464 positives and 2698 negatives. The results are shown below in Table 3. In the experiment, one frame for every second for the first ten seconds was used. Simple aggregation was performed and this aggregation of the per-frame classifiers provided a result that sacrifices recall for a higher precision.

In a non-limiting example, using an Ada-Boost classifier may show that a classifier score is proportional to a linear combination of weak binary classifiers that are based on the individual features. If a threshold is used on the classifier response at the absolute lowest response level, then all values can be taken as spherical and the classification system provides 100% true positive rates and 100% true false positive rates. As shown in FIG. 5, a linear portion 502 of the graph 500 on the right hand side may be due to a number of positive and negative test samples sharing the next lowest value (including those that were rejected by the first layer). The remaining variations in the graph (shown by peaks and valleys shown at 504) may be due to the Ada-Boost classifier outputting a confidence score that, while continuous, may only take on a discrete set of values (pow(2, num_features)).

The lower recall may be due to many of the spherical videos having long introduction or title screens with no identifiable spherical content that took up tens of seconds at the beginning of the videos. Such videos could be properly classified if the experiment had been using frames from a longer segment of the video. The remaining false negatives may have been due to variability beyond what was seen in the training data, for example, they were stitched with different camera rigs with large black regions at the bottom, they were computer graphic generated images with content in regions of the frame that didn't lead to spherical distortion, or they were captured in evenings with much darker image statistics. The recall of the detector could be improved with a second round of training that includes these types of variation.

TABLE 3

|  | Video |
| --- | --- |
| accuracy | 0.9409 |
| precision | 0.9947 |
| TPR | 0.6051 |
| FPR | 0.00037 |

Figure 6:
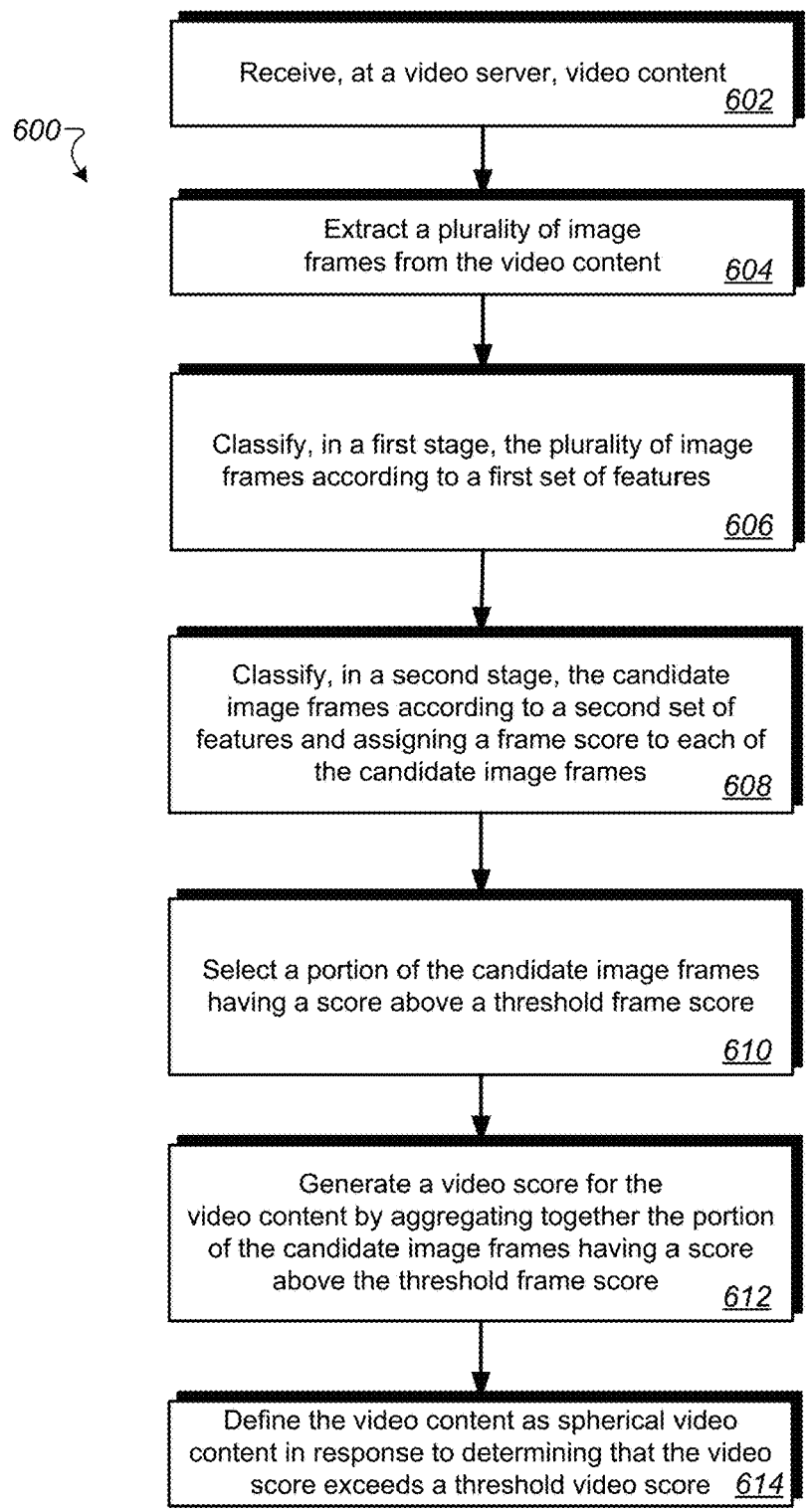
FIG. 6 is a flow chart diagramming one embodiment of a process to classify video content.

FIG. 6 is a flow chart diagramming one embodiment of a process 600 to classify video content. The process 600 may be carried out, in one example, by devices and logic shown in FIG. 1. At block 602, the process 600 may include receiving, at a video server, video content. The video content may be uploaded to a video server system 106 by a user. For example, the user may upload video content to a file sharing video website. The video server system 106 can perform a number of operations to analyze the uploaded video content.

At block 604, the process 600 may include extracting a plurality of image frames from the video content. For example, the extractor module 110 can extract particular image frames form the uploaded video content. In one example, the extractor module 110 can extract video frames from the first ten seconds of video content. In other implementations, the extractor module 110 can extract other portions of image frames of the video content (randomly or sequentially).

At block 606, the process 600 may include classifying, in a first stage, the plurality of image frames according to a first set of features. The classifying may be performed by the classifier module 114. The classifying may include defining or identifying a portion of the plurality of image frames as candidate image frames. For example, the portion of image frames may be selected based on feature analysis. The feature analysis may include calculating or reviewing one or more of the first set of features. The first set of features may include at least two calculations pertaining to an aspect ratio for the image frames, a video dimension for the image frames, a standard deviation at both image poles for the image frames, and/or a left and right border variance for the image frames. In some implementations, the classifying in the first stage may include analyzing at least two edges of each of the plurality of image frames.

At block 608, the process 600 may include classifying, in a second stage, the candidate image frames according to a second set of features. The classifying may be performed by the classifier module 116. The classifying may include assigning a frame score to each of the candidate image frames. The frame score may be based on at least one of the second set of features. The second set of features may includes at least two calculations corresponding to the candidate image frames and the calculations may include calculating a standard deviation for particular image frames, calculating an edge detection for particular image frames, calculating an image entropy or an image entropy of the edge detection for particular image frames, calculating a Hough transform, a measure of texture for at least one pole defined in at least one image frame, and/or a metric corresponding to an edge of at least one image frame and a column of pixels adjacent to the edge.

In some implementations, the classifying performed in the second stage includes analyzing central regions of the candidate image frames. In some implementations, the second stage of classification may include performing at least one of generating a grayscale version of the candidate image frames and calculating a standard deviation of the grayscale version of the candidate image frames, calculating entropy of the grayscale version of the candidate image frames, and/or calculating entropy of an edge detected version of the candidate image frames.

At block 610, the process 600 may include selecting a portion of the candidate image frames having a frame score satisfying a threshold frame score condition. The selection may be performed by the video server system 106 using image analyzer 112. The threshold frame score may be defined such that the false positive rate (FPR) of the two-level image classification is kept below a particular level. In the first level (606), the thresholds may be chosen to maintain high true positive rate (of ideally 1), while reducing as many of the false positives as possible. After the second level classification, the threshold may be chosen to keep false positives rate low at the expense of sacrificing some true positives.

At block 612, the process 600 may include generating a video score for the video content by aggregating together the portion of the candidate image frames having a frame score that satisfies the threshold frame score. In some implementations, satisfying the threshold frames score includes scoring above the threshold frame score. For example, the scoring module 118 may be used to generate a video score for each video. The threshold video score may be defined such that the final video classification false positive rate is kept below a desired rate, for example, less than about 0.1%.

At block 614, the process may include identifying the video content as spherical video content in response to determining that the video score exceeds a threshold video score.

In some implementations, the process 600 may also include monitoring for additional video content, at a video server. For example, the video server system 106 can monitor uploaded video content to ensure proper classification and accessibility is provided for spherically captured content. In response to detecting uploaded video content, the video server system 106 can automatically perform the first stage and the second stage classifications steps described herein in order to classify the uploaded video content.

In some implementations, the first and second classification stages are configured using a plurality of training videos configured to model spherical and non-spherical video content according to the first set of features and the second set of features.

Figure 7:
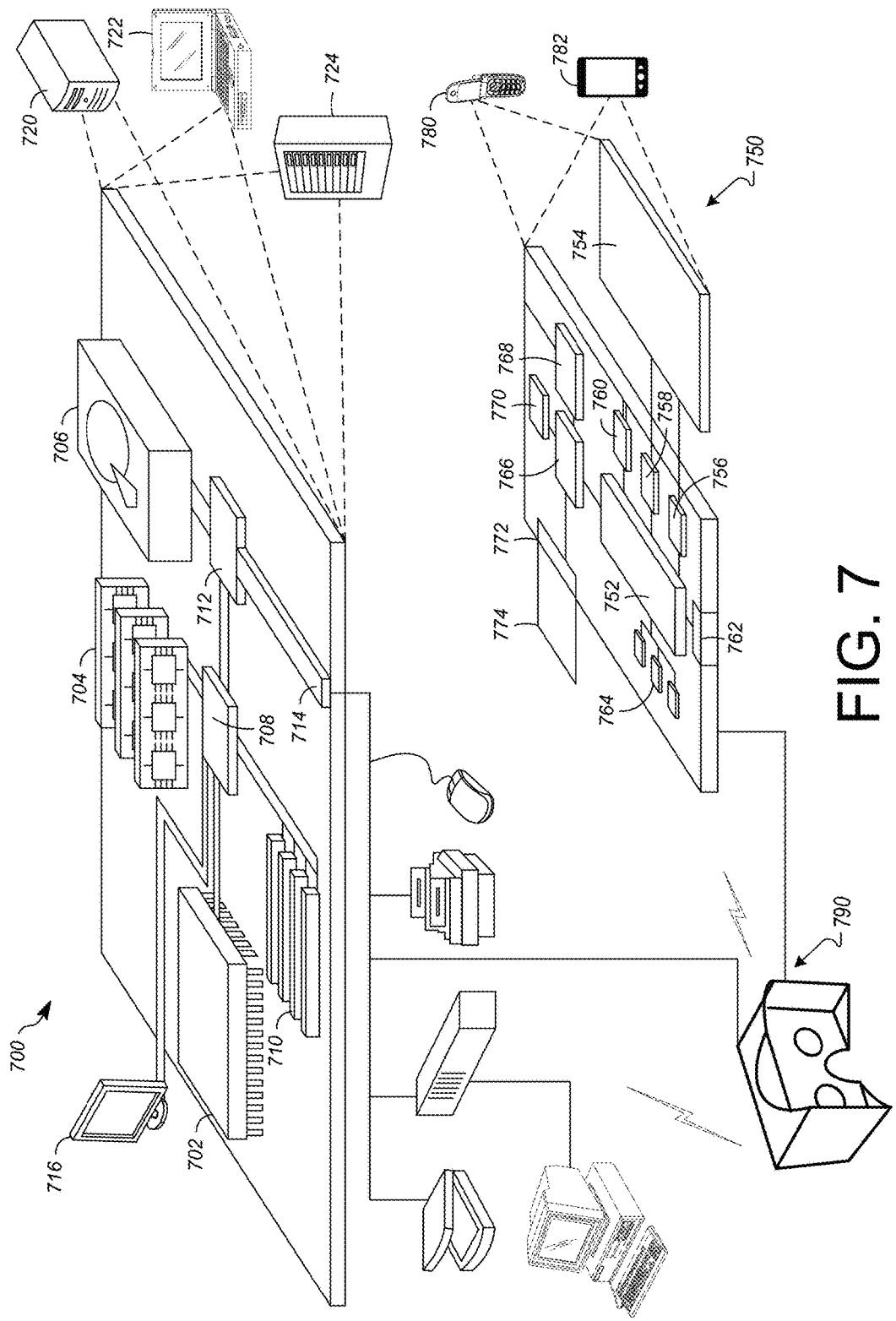
FIG. 7 shows an example of a computer device and a mobile computer device that can be used to implement the techniques described herein.

In some implementations, the process 600 may include receiving video content at a video server and extracting image frames from the video content. The method may also include classifying, during a first stage, the image frames according to a first set of features. The classifying may include identifying a candidate image frame from the extracted image frames. The process 600 can also include assigning, during a second stage, a frame score to the candidate image based on at least one of the second set of features and selecting the candidate image frame when the frame score satisfies a threshold frame score condition. The process 600 may additionally include generating a video score for the video content based on the candidate image frame and defining the video content as spherical video content in response to determining that the video score satisfies a threshold video score. FIG. 7 shows an example of a generic computer device 700 and a generic mobile computer device 750, which may be used with the techniques described here. Computing device 700 includes a processor 702, memory 704, a storage device 706, a high-speed interface 708 connecting to memory 704 and high-speed expansion ports 710, and a low speed interface 712 connecting to low speed bus 714 and storage device 706.

Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. In addition, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 7 can include sensors that interface with a virtual reality (VR headset 790). For example, one or more sensors included on a computing device 750 or other computing device depicted in FIG. 7, can provide input to VR headset 790 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 750 can use the sensors to determine an absolute position and/or a detected rotation of the computing device in the VR space that can then be used as input to the VR space. For example, the computing device 750 may be incorporated into the VR space as a virtual object, such as a controller, a laser pointer, a keyboard, a weapon, etc. Positioning of the computing device/virtual object by the user when incorporated into the VR space can allow the user to position the computing device to view the virtual object in certain manners in the VR space.

In some implementations, one or more input devices included on, or connect to, the computing device 750 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the VR space can cause a particular action to occur in the VR space.

In some implementations, a touchscreen of the computing device 750 can be rendered as a touchpad in VR space. A user can interact with the touchscreen of the computing device 750. The interactions are rendered, in VR headset 790 for example, as movements on the rendered touchpad in the VR space. The rendered movements can control objects in the VR space.

In some implementations, one or more output devices included on the computing device 750 can provide output and/or feedback to a user of the VR headset 790 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method to identify spherical video content, the method comprising:
   receiving, at a video server, video content;
   identifying a plurality of image frames in the video content as candidate image frames;
   classifying the candidate image frames according to a plurality of image features, the classifying including assigning a frame score to each of the candidate image frames;
   identifying a portion of the candidate image frames having a frame score satisfying a threshold condition pertaining to at least one of the plurality of image features; and
   generating a video score for the video content by aggregating the frame scores for the portion of the candidate image frames having a frame score satisfying the threshold condition, wherein the video score is used to configure playback of the video content in response to determining that the video score satisfies a threshold video score.

2. The method of claim 1, further comprising:
   labeling the video content as spherical video content in response to determining that the video score satisfies a threshold video score.

3. The method of claim 1, wherein the video score indicates a likelihood of spherical video image features being detected in at least one of the candidate image frames in the portion.

4. The method of claim 1, wherein the classifying of the candidate image frames includes:
   unwarping the candidate image frames to generate unwarped candidate image frames;
   detecting a plurality of edges of each unwarped candidate image frame and determining whether portions of the detected plurality of edges are curved.

5. The method of claim 4, further comprising assigning a frame score that satisfies the threshold condition, in response to determining an unwarped version of a candidate image frame in the candidate image frames includes more curved edges than straight edges.

6. The method of claim 1, wherein the plurality of image features include at least an aspect ratio determined for each of the candidate image frames, the aspect ratio being used as an indication that video content that includes a respective candidate image includes spherical content, if the aspect ratio associated with the respective candidate image indicates an equal number of pixels per degree of view.

7. The method of claim 1, wherein the plurality of image features include at least a determined variance level between columns of pixels in at least one candidate image frame.

8. A video management system including instructions stored on a non-transitory computer-readable storage medium, the system comprising:
   at least one processor; and
   a memory comprising instructions which, when executed by the at least one processor, cause the at least one processor to:
      receive, at a video server, video content;
      identify a plurality of image frames in the video content as candidate image frames;
      classify the candidate image frames according to a plurality of image features, the classifying including assigning a frame score to each of the candidate image frames;
      identify a portion of the candidate image frames having a frame score satisfying a threshold condition pertaining to at least one of the plurality of image features; and
      generate a video score for the video content by aggregating the frame scores for the portion of the candidate image frames having a frame score satisfying the threshold condition, wherein the video score is used to configure playback of the video content in response to determining that the video score satisfies a threshold video score.

9. The video management system of claim 8, wherein the at least one processor is further operable to:
   label the video content as spherical video content in response to determining that the video score satisfies a threshold video score.

10. The video management system of claim 8, wherein the video score indicates a likelihood of spherical video image features being detected in at least one of the candidate image frames in the portion.

11. The video management system of claim 8, wherein the classifying of the candidate image frames includes:
   unwarping the candidate image frames to generate unwarped candidate image frames;
   detecting a plurality of edges of each unwarped candidate image frame and determining whether portions of the detected plurality of edges are curved.

12. The video management system of claim 11, wherein the at least one processor is further operable to:
   assign a frame score that satisfies the threshold condition, in response to determining an unwarped version of a candidate image frame in the candidate image frames includes more curved edges than straight edges.

13. The video management system of claim 8, wherein the plurality of image features include at least an aspect ratio determined for each of the candidate image frames, the aspect ratio being used as an indication that video content that includes a respective candidate image includes spherical content, if the aspect ratio associated with the respective candidate image indicates an equal number of pixels per degree of view.

14. The video management system of claim 8, wherein the plurality of image features include at least a determined variance level between columns of pixels in at least one candidate image frame.

15. A non-transitory recordable storage medium having recorded and stored thereon instructions that, when executed by a processor, perform actions of:
   receiving image content;
   identifying a plurality of image frames in the image content as candidate image frames;
   classifying the candidate image frames according to a plurality of image features, the classifying including assigning a frame score to each of the candidate image frames;
   identifying a portion of the candidate image frames having a frame score satisfying a threshold condition; and
   generating an overall score for the image content by aggregating the frame scores for the portion of the candidate image frames having a frame score satisfying the threshold condition, wherein the overall score is used to configure playback of the image content in response to determining that the overall score satisfies a threshold score.

16. The non-transitory recordable storage medium of claim 15, wherein the actions further include:
   labeling the image content as spherical image content in response to determining that the overall score satisfies a predefined threshold score.

17. The non-transitory recordable storage medium of claim 15, wherein the overall score indicates a likelihood of spherical image features being detected in at least one of the candidate image frames in the portion.

18. The non-transitory recordable storage medium of claim 15, wherein the classifying of the candidate image frames includes:
   unwarping the candidate image frames to generate unwarped candidate image frames;
   detecting a plurality of edges in each unwarped candidate image frame and determining whether portions of the detected plurality of edges are curved.

19. The non-transitory recordable storage medium of claim 18, wherein the actions further include:
   assigning a frame score that satisfies the threshold condition, in response to determining an unwarped version of a candidate image frame in the candidate image frames includes more curved edges than straight edges.

20. The non-transitory recordable storage medium of claim 15, wherein the plurality of image features include at least an aspect ratio determined for each of the candidate image frames, the aspect ratio being used as an indication that image content that includes a respective candidate image includes spherical content, if the aspect ratio associated with the respective candidate image indicates an equal number of pixels per degree of view.

* * * * *

UNITED STATES PATENT AND TRADEMARK OFFICE
CERTIFICATE OF CORRECTION

Page 1 of 1

PATENT NO. : 10,268,893 B2
APPLICATION NO. : 15/680594
DATED : April 23, 2019
INVENTOR(S) : Birkbeck et al.

It is certified that error appears in the above-identified patent and that said Letters Patent is hereby corrected as shown below:

On the Title Page

On Page 2, Column 2, item (56), under "OTHER PUBLICATIONS", Line 22, delete "Medecine"," and insert -- Medicine", --, therefor.

On Page 2, Column 2, item (56), under "OTHER PUBLICATIONS", Line 23, delete "Medecine," and insert -- Medicine, --, therefor.

On Page 2, Column 2, item (56), under "OTHER PUBLICATIONS", Line 35, delete "Ihang," and insert -- Zhang, --, therefor.

Signed and Sealed this
Twentieth Day of August, 2019

Andrei Iancu
*Director of the United States Patent and Trademark Office*